US007734108B2

(12) United States Patent
Oura

(10) Patent No.: US 7,734,108 B2
(45) Date of Patent: Jun. 8, 2010

(54) IMAGE PROCESSING CIRCUIT

(75) Inventor: Hisaharu Oura, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 993 days.

(21) Appl. No.: 11/458,545

(22) Filed: Jul. 19, 2006

(65) Prior Publication Data

US 2007/0019878 A1 Jan. 25, 2007

(30) Foreign Application Priority Data

Jul. 21, 2005 (JP) ............................. 2005-210995

(51) Int. Cl.

*G06K 9/00* (2006.01)
*G09G 3/00* (2006.01)
*G09G 3/18* (2006.01)
*G09G 3/36* (2006.01)

(52) U.S. Cl. ........................... 382/251; 345/30; 345/50; 345/51; 345/87; 345/98

(58) Field of Classification Search ................. 382/251; 345/30, 50–51, 87, 98

See application file for complete search history.

(56) References Cited

U.S. PATENT DOCUMENTS

| | | | | |
|---|---|---|---|---|
| 6,937,232 | B2 | 8/2005 | Lin et al. | |
| 2003/0210217 | A1 | 11/2003 | Lee | |
| 2005/0052387 | A1* | 3/2005 | Oda et al. | 345/87 |
| 2005/0068343 | A1 | 3/2005 | Pan et al. | |
| 2007/0001955 | A1 | 1/2007 | Lee | |

FOREIGN PATENT DOCUMENTS

| | | |
|---|---|---|
| JP | 6-334873 | 12/1994 |
| JP | CN 1625764 A | 6/2005 |
| KR | 10-2004-0064950 | 7/2004 |

* cited by examiner

*Primary Examiner*—Samir A Ahmed
*Assistant Examiner*—Fred Hu
(74) *Attorney, Agent, or Firm*—Oblon, Spivak, McClelland, Maier & Neustadt, L.L.P.

(57) ABSTRACT

The present invention provides an image processing circuit capable of properly determining whether or not image data is a static image or a moving image and performing overdrive processing thereon. The image processing circuit includes a quantization unit (quantization/threshold-value proximity determination circuit) for quantizing image data input to a liquid crystal display with a predetermined threshold value and outputting the quantized data, a threshold-value proximity determination unit (quantization/threshold-value proximity determination circuit) for determining whether or not the image data is proximal to the threshold value and outputting threshold-value proximity determination data, a moving-image/static-image determination unit (moving-image/static-image determination circuit) for determining whether or not the image data of a current frame is a static image or a moving image, on the basis of the quantized data and the threshold-value proximity determination data of the current frame and the quantized data and the threshold-value proximity determination data of the previous frame, and an overdrive processing unit (LUT, moving-image/static-image processing circuit) for outputting the image data which has been subjected to overdrive processing if the moving-image/static-image determination unit determines that the image data is a moving image.

7 Claims, 5 Drawing Sheets

FIG. 1

| | | | | | | | | |
|---|---|---|---|---|---|---|---|---|
| THRESHOLD VALUE | | 8 | 16 | 24 | 32 | 40 | 48 | 56 |
| IMAGE DATA | 0~7 | 8~15 | 16~23 | 24~31 | 32~39 | 40~47 | 48~55 | 56~63 |
| QUANTIZED DATA | 000 | 001 | 010 | 011 | 100 | 101 | 110 | 111 |

CURRENT FRAME

PREVIOUS FRAME

| | 0 | 1 | 2 | 3 | 4 | 5 | 6 | 7 |
|---|---|---|---|---|---|---|---|---|
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |

IMAGE PROCESSING CIRCUIT

BACKGROUND OF THE INVENTION

1. Field of the Invention

The present invention relates to an image processing circuit and, more particularly, to an image processing circuit for use in a liquid crystal display.

2. Description of the Background Art

In recent years, liquid crystal displays have been utilized in various fields and have been utilized in televisions as well as in PC monitors. However, liquid crystal displays have low response speeds, thereby including the problem of degradation of display quality due to afterimages in cases where moving images are mainly displayed thereon as in TV applications. Therefore, overdrive processing methods have been applied to liquid crystal displays, in order to increase their response speeds. Overdrive processing is a processing method for, in cases where image data is moving images, setting the voltage applied to the liquid crystal to be higher than usual if the direction of data change from the previous frame to the current frame is positive, but setting the voltage to be lower than usual if the direction of data change from the previous frame to the current frame is negative. This method can improve the display quality of moving images.

As overdrive processing commonly applied to liquid crystal displays, there is a method which calculates the amount of overdrive using a look-up table (LUT). However, this method requires an LUT provided in accordance with the number of gray-scale of image data, which has induced the problem of increases of data due to great numbers of gray-scale. Consequently, image data has been quantized with predetermined threshold values and an LUT has been applied to such quantized data to reduce the amount of data in the LUT.

Furthermore, in the case where overdrive processing is applied to a liquid crystal display, the overdrive processing is performed if image data to be displayed is a moving image, which requires determination as to whether or not the image data to be displayed is a static image or a moving image. Further, image processing for image data is disclosed in, for example, Japanese Patent Application Laid-Open No. 06-334873 (1994).

As described above, when image data is quantized with a predetermined threshold value, quantized data thereof is utilized for determining whether or not the image data is a moving image or a static image. In this case, if there is a large difference between the image data of a current frame and the image data of the previous frame (a difference greater than several gray-scale), the image data is absolutely determined to be a moving image and overdrive processing is performed thereon.

Further, if the change to the image data of a current frame from the image data of the previous frame is about a single gray-scale, but the change strides a quantization threshold value, the image data is determined to be a moving image since their quantized values are different and overdrive processing is performed thereon. Such changes about a single gray-scale may be caused by FRC (Frame Rate Control) processing, which is pseudo gray-scale expression, or by noise. Consequently, there has been caused the problem that image data which is actually a static image is determined to be a moving image and unnecessary overdrive processing is performed thereon.

If overdrive processing is performed on image data which is actually a static image and is not required to be subjected to overdrive processing, this will cause image quality degradation due to enhanced FRC processing or image quality degradation due to enhanced noise.

SUMMARY OF THE INVENTION

It is an object of the present invention to provide an image processing circuit capable of properly determining whether or not image data is a static image or a moving image and performing overdrive processing thereon.

An image processing circuit according to the present invention includes a quantization unit, a threshold-value proximity determination unit, a moving-image/static-image determination unit, and an overdrive processing unit. The quantization unit quantizes image data input to a liquid crystal display with a predetermined threshold value and outputs the quantized data. The threshold-value proximity determination unit determines whether or not the image data is proximal to the threshold value and outputs threshold-value proximity determination data. The moving-image/static-image determination unit determines whether or not the image data of a current frame is a static image or a moving image, on the basis of the quantized data and the threshold-value proximity determination data of the current frame and the quantized data and the threshold-value proximity determination data of the previous frame. The overdrive processing unit outputs the image data which has been subjected to overdrive processing if the moving-image/static-image determination unit determines that the image data is a moving image.

The image processing circuit according to the present invention determines whether or not image data of a current frame is a static image or a moving image, on the basis of the quantized data and the threshold-value proximity determination data of a current frame and the basis of the quantized data and the threshold-value proximity determination data of the previous frame and, accordingly, it is capable of properly determining whether or not image data is a static image or a moving image and performing overdrive processing thereon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view for explaining a quantization method;

DESCRIPTION OF THE PREFERRED EMBODIMENTS

In the case of performing overdrive processing using a look up table (LUT), as described above, image data is quantized with predetermined threshold values to determine quantized data. FIG. 1 illustrates a concrete example of an image-data quantization method. FIG. 1 illustrates quantization of 6-bit image data (64 gray-scale) into 3-bit quantized data, with seven threshold values (a 8-th gray-scale, a 16-th gray-scale, a 24-th gray-scale, a 32-th gray-scale, a 40-th gray-scale, a 48-th gray-scale and a 56-th gray-scale). For example, image data in the range of 0-th to 7-th gray-scale is expressed as quantized data of "000" (binary value).

Figures 2, 3:
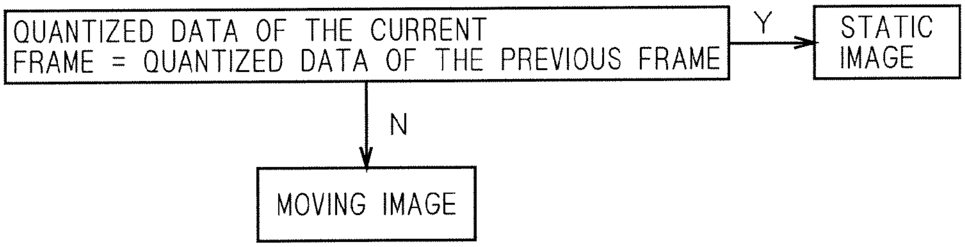
FIG. 2 is a view for explaining a moving-image/static-image determination method.
FIG. 3 is a view for explaining an LUT according to an embodiment of the present invention.

In cases of performing moving-image/static-image determination on image data on the basis of quantized data which has been resulted from quantization as described above, the determination is generally performed according to a flow chart illustrated in FIG. 2. In FIG. 2, a comparison is made between the quantized data of a current frame and the quantized data of the previous frame and, if they are equal, then the image data is determined to be a static image, but if they are different from each other, then the image data is determined to be a moving image.

Then, if the image data is determined to be a moving image, then overdrive processing is performed using an LUT as illustrated in FIG. 3. In the LUT illustrated in FIG. 3, the quantized data of the previous frame is designated in the vertical direction while the quantized data of the current frame is designated in the horizontal direction. For example, if the quantized data of the previous frame is "000" (binary value)=0 (decimal value) and the quantized data of the previous frame is "010" (binary value)=2 (decimal value), the image data is determined to be a moving image in the flow chart of FIG. 2, and the data stored in the cell at the intersection of "0" in the vertical direction and "2" (decimal value) in the horizontal direction in the LUT illustrated in FIG. 3 is selected as the amount of overdrive. Also, the LUT illustrated in FIG. 3 may store, in the respective cells thereof, differences from data to be usually applied to the liquid crystal or data to be applied to the liquid crystal after overdrive processing.

Figure 4:
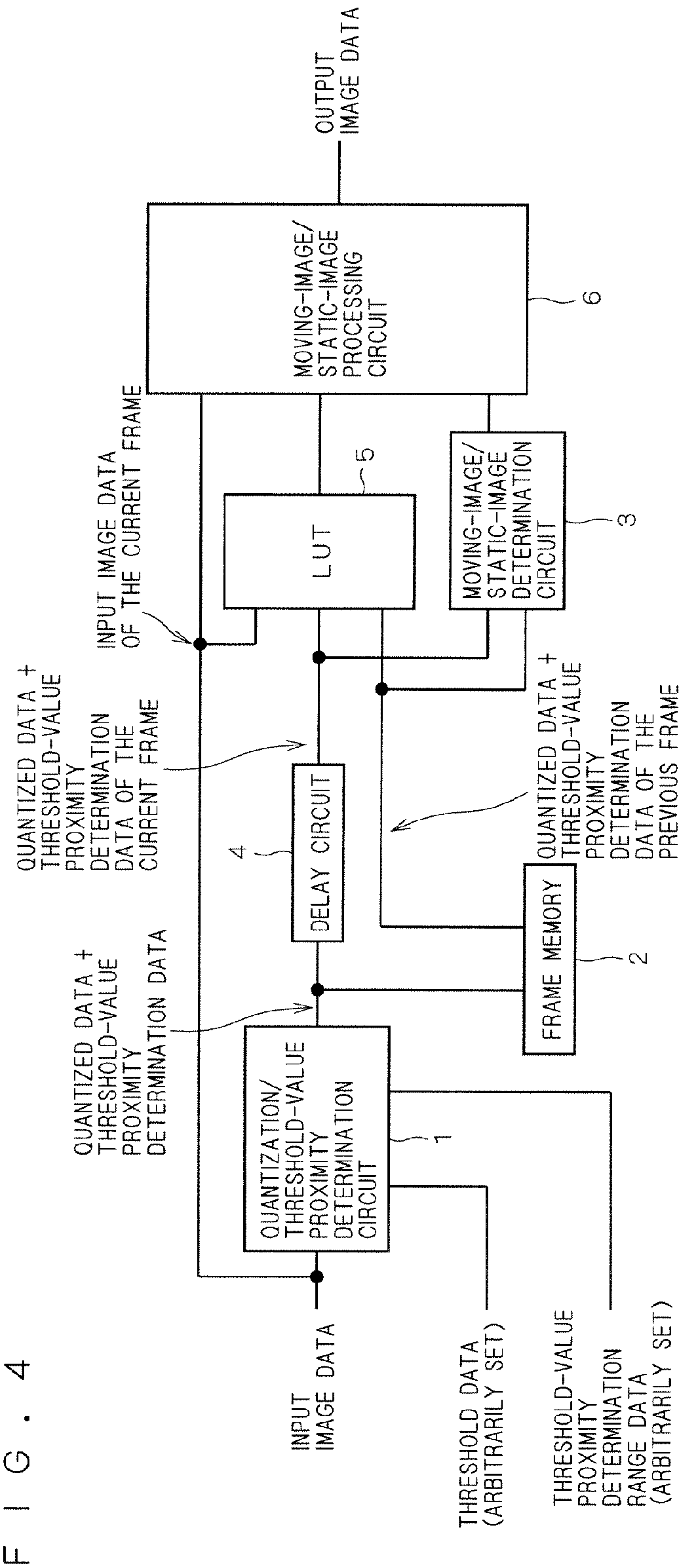
FIG. 4 is a block diagram of an image processing circuit according to an embodiment of the present invention.

Next, FIG. 4 illustrates a block diagram of an image processing circuit according to the present embodiment. In the image processing circuit illustrated in FIG. 4, input image data is input to a quantization threshold-value proximity determination circuit 1. The quantization/threshold-value proximity determination circuit 1 quantizes the input image data on the basis of predetermined threshold-value data which has been input thereto and outputs quantized data. Further, as the quantizing method, a method as illustrated in FIG. 1 is employed.

Further, the quantization/threshold-value proximity determination circuit 1 determines whether or not the input image data is close to a threshold value, on the basis of threshold-value proximity determination range data, and outputs threshold-value proximity determination data. In this case, the threshold-value proximity determination range data is data for use in setting a threshold-value proximity determination range (for example, a range from a threshold value to a value smaller than the threshold value by predetermined gray-scale). More specifically, if a range from a threshold value to a value smaller than the threshold value by two gray-scale is input as threshold-value proximity determination range data (the 6-th and 7-th gray-scale, in the case where the threshold value is the 8-th gray-scale), input image data of the 6-th gray-scale is determined to be proximal to the threshold value while input image data of the 5-th gray-scale is determined not to be proximal to the threshold value.

As previously described, the quantization/threshold-value proximity determination circuit 1 includes a quantization unit for quantizing input image data and a threshold-value proximity determination unit for performing threshold-value proximity determination. The quantization/threshold-value proximity determination circuit 1 outputs quantized data and threshold-value proximity determination data. More specifically, for example, if input image data of the 6-th gray-scale is input to the quantization/threshold-value proximity determination circuit 1 where it is quantized according to the method of FIG. 1, the quantization/threshold-value proximity determination circuit 1 outputs quantized data of "000" (binary value). Further, if the aforementioned threshold-value proximity determination range data is set in the quantization/threshold-value proximity determination circuit 1, the input image data of the 6-th gray-scale is determined to be proximal to the threshold value and, thus, the threshold-value proximity determination data becomes 1. Also, it is assumed that the threshold-value proximity determination data becomes 1 when input image data is proximal to the threshold value while it becomes "0" when the input image data is not proximal to the threshold value. Accordingly, the quantization/threshold-value proximity determination circuit 1 outputs a total of 4 bits which is 3-bit quantized data plus 1-bit threshold-value proximity determination data.

In the present embodiment, a comparison is made between the quantized data and the threshold-value proximity determination data of a current frame and the quantized data and the threshold-value proximity determination data of the previous frame to perform moving-image/static-image determination. Accordingly, as illustrated in FIG. 4, there is provided a frame memory 2 for storing the quantized data and the threshold-value proximity determination data of the previous frame.

The quantized data and the threshold-value proximity determination data of the previous frame which are stored in the frame memory 2 and the quantized data and the threshold-value proximity determination data of the current frame which are output from the quantization/threshold-value proximity determination circuit 1 are input to a moving-image/static-image determination circuit 3 which is a moving-image/static-image determination unit. Further, a delay circuit 4 is provided between the quantization/threshold-value proximity determination circuit 1 and the moving-image/static-image determination circuit 3 such that the quantized data and the threshold-value proximity determination data of the previous frame and the quantized data and the threshold-value proximity determination data of the current frame are input, at predetermined timing, to the moving-image/static-image determination circuit 3.

The moving-image/static-image determination circuit 3 determines whether the input image data is a moving image or a static image, on the basis of the quantized data and the threshold-value proximity determination data of the previous frame and the quantized data and the threshold-value proximity determination data of the current frame. This determination method will be described later.

Further, in the present embodiment, overdrive processing is performed on input image data. In the image processing circuit illustrated in FIG. 4, there is provided an LUT 5 and the amount of overdrive is determined, on the basis of the quantized data of the previous data and the quantized data of the current frame. The LUT 5 has the same structure as that illustrated in FIG. 3, and the value stored in the cell corresponding to the quantized data of the previous frame and the quantized data of the current frame is selected as the amount of overdrive. Input image data which has been subjected to the overdrive processing on the basis of the selected amount of overdrive is output from the LUT 5.

Further, in the image processing circuit illustrated in FIG. 4, there is provided a moving-image/static-image processing circuit 6. If the moving-image/static-image determination circuit 3 determines that the input image data is a moving image, the moving-image/static-image processing circuit 6 outputs, as output image data, the overdrive-processed input image data output from the LUT 5. On the other hand, if the moving-image/static-image determination circuit 3 determines that the input image data is a static image, the moving-image/static-image processing circuit 6 directly outputs the input image data as output image data.

Further, the image processing circuit illustrated in FIG. 4 is configured to perform overdrive processing on all input image data, regardless of whether or not input image data varies near the threshold value. However, the present invention is not limited thereto and the image processing circuit may be configured to perform overdrive processing only on input image data which has been determined to be a moving image by the moving-image/static-image determination circuit 3.

Figure 5:
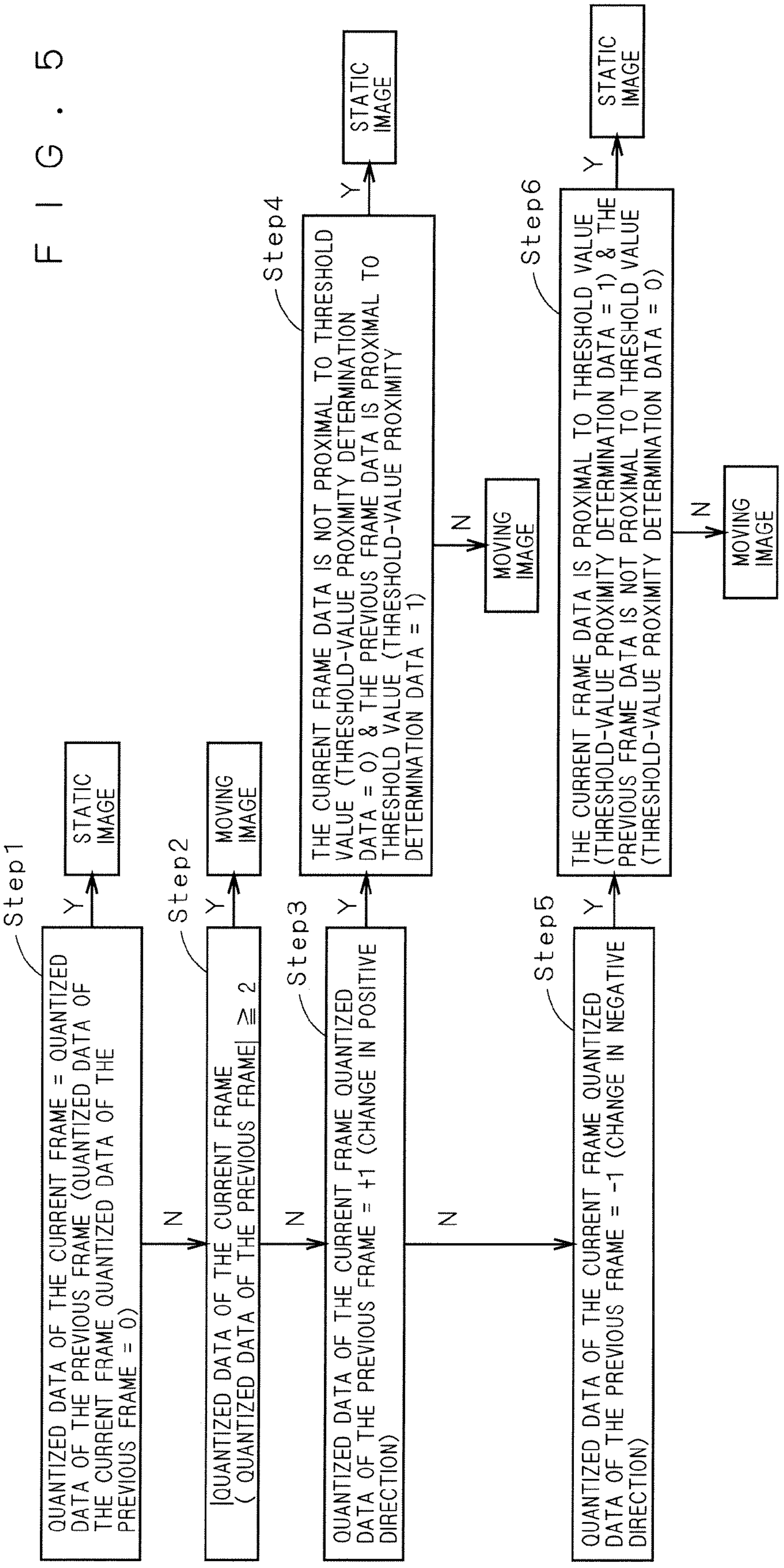
FIG. 5 is a flow chart diagram for moving-image/static-image determination with the image processing circuit according to the embodiment of the present invention.

Next, there will be described a method for determining whether input image data is a moving image or a static image with the moving-image/static-image determination circuit 3. FIG. 5 illustrates a flow chart for moving-image/static-image determination in the moving-image/static-image determination circuit 3. At first, in the flow chart illustrated in FIG. 5, in Step 1, it is determined whether or not the quantized data of the current frame is equal to the quantized data of the previous frame (it is determined whether or not the difference between the quantized data of the current frame and the quantized data of the previous frame is 0). If the determination in Step 1 results in Yes, then the input image data is determined to be a static image, while if the determination results in No, the processing proceeds to Step 2.

In Step 2, it is determined whether or not the absolute value of the difference between the quantized data of the current frame and the quantized data of the previous frame is equal to or greater than 2. If the determination in Step 2 results in Yes, then the input image data is determined to be a moving image, while if the determination results in No, then the processing proceeds to Step 3. In Step 3, it is determined whether or not the difference determined by subtracting the quantized data of the previous frame from the quantized data of the current frame is +1 (the quantized value of the quantized data of the current data is greater by 1 than the quantized data of the previous frame). If the determination in Step 3 results in Yes, the processing proceeds to Step 4, while if the determination results in No, then the processing proceeds to Step 5.

In Step 4, it is determined whether or not the threshold-value proximity determination data of the current frame is "0" (not proximal to the threshold value) and also the threshold-value proximity determination data of the previous frame is "1" (proximal to the threshold value). If the determination in Step 4 results in Yes, then the input image data is determined to be a static image, while if the determination results in No, then the input image data is determined to be a moving image.

In Step 5, it is determined whether or not the difference determined by subtracting the quantized data of the previous frame from the quantized data of the current frame is −1 (the quantized value of the quantized data of the current data is smaller by 1 than the quantized data of the previous frame). If the determination in Step 5 results in Yes, the processing proceeds to Step 6. In Step 6, it is determined whether or not the threshold-value proximity determination data of the current frame is "1" (proximal to the threshold value) and also the threshold-value proximity determination data of the previous frame is "0" (not proximal to the threshold value). If the determination in Step 6 results in Yes, then the input image data is determined to be a static image, while if the determination results in No, then the input image data is determined to be a moving image.

Figure 6A:
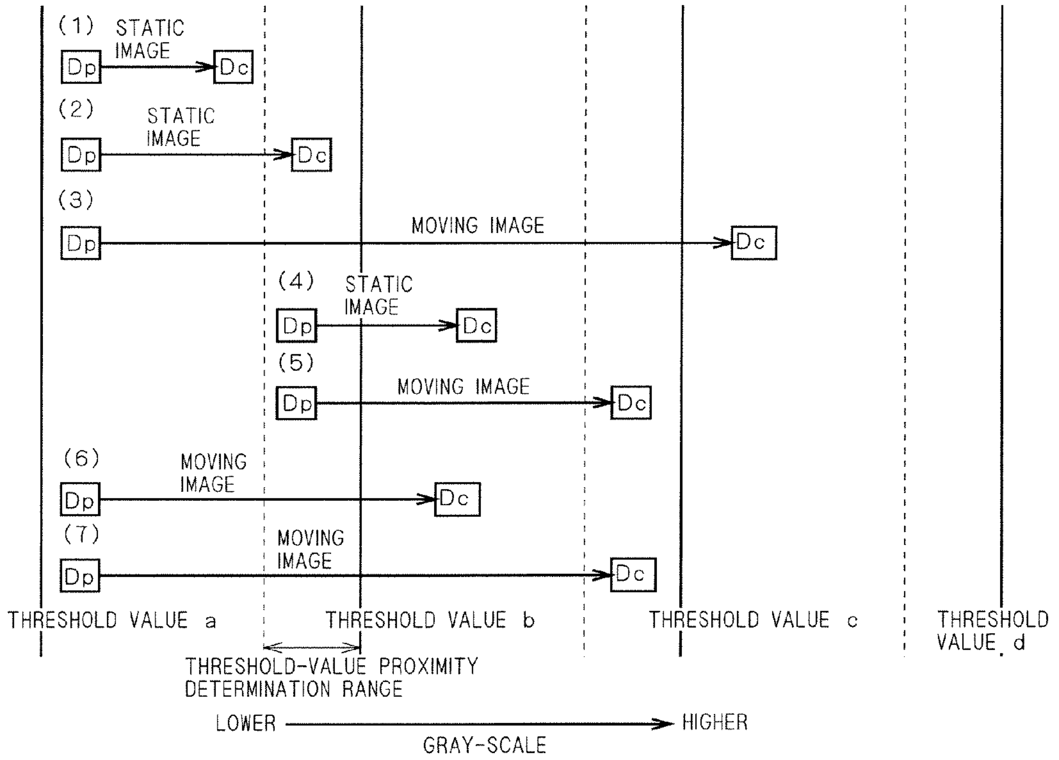
FIGS. 6A and 6B are views each explaining the moving-image/static-image determination in the image processing circuit according to the embodiment of the present invention.
Figure 6B:
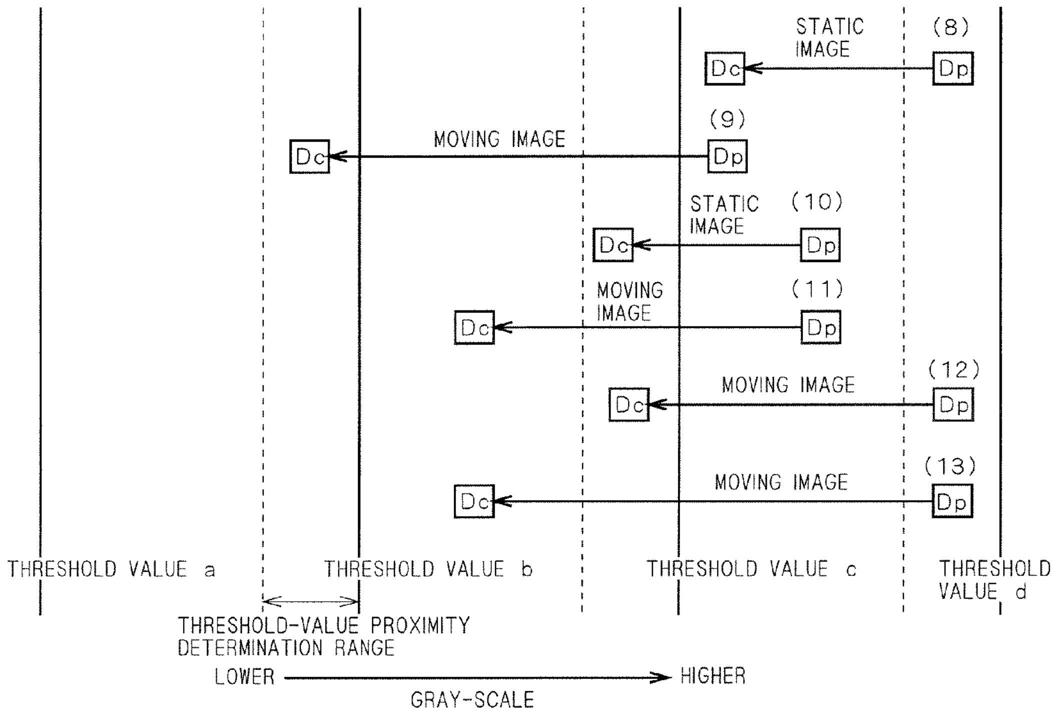

Next, the flow chart illustrated in FIG. 5 will be described in detail. FIGS. 6A and 6B illustrate views for explaining the moving-image/static-image determination. FIG. 6A illustrates cases where the change to the image data Dc of a current frame from the image data Dp of the previous frame is in the direction of gray-scale increase (change in the positive direction). On the contrary, FIG. 6B illustrates cases where the change to the image data Dc of a current frame from the image data Dp of the previous frame is in the direction of gray-scale decrease (change in the negative direction). In FIGS. 6A and 6B, there are illustrated threshold values a to d, wherein threshold-value proximity determination ranges are set over the ranges from the threshold values b, c and d to values smaller by predetermined gray-scale than the respective threshold values.

In an example (1) illustrated in FIG. 6A, the change to the image data Dc of a current frame from the image data Dp of the previous frame does not exceed the threshold value b and, therefore, it is determined that the quantized data of the current data is equal to the quantized data of the previous frame and, thus, the image data is a static image. Similarly, in an example (2) illustrated in FIG. 6A, the image data Dc of the current frame does not exceed the threshold value b and, therefore, it is determined that the image data is a static image. Further, in an example (3) illustrated in FIG. 6A, the change to the image data Dc of the current frame from the image data Dp of the previous frame exceeds the threshold value b and the threshold value c and, therefore, the difference between the quantized data of the current data and the quantized data of the previous frame is 2 and, thus, the image data is determined to be a moving image.

In examples (4) to (7) illustrated in FIG. 6A, the change to the image data Dc of a current frame from the image data Dp of the previous frame exceeds the threshold value b. However, in the example (4), the image data Dp of the previous frame is within the threshold-value proximity determination range (the threshold-value proximity determination data is "1") and the image data Dc of the current frame is out of the threshold-value proximity determination range (the threshold-value proximity determination data is "0") and, therefore, the image data is determined to be a static image. Further, in the examples (5) to (7), the image data is determined to be a moving image. Further, in the example (5), the image data Dp of the previous frame is within the threshold-value proximity determination range and the image data Dc of the current frame is also within the threshold-value proximity determination range. In the example (6), the image data Dp of the previous frame is out of the threshold-value proximity determination range and the image data Dc of the current frame is also out of the threshold-value proximity determination range. In the example (7), the image data Dp of the previous frame is out of the threshold-value proximity determination range, but the image data Dc of the current frame is within the threshold-value proximity determination range.

Next, there will be described changes in the negative direction illustrated in FIG. 6B. In an example (8) illustrated in FIG. 6B, the change to the image data Dc of a current frame from the image data Dp of the previous frame does not exceed the threshold value c and, therefore, it is determined that the quantized data of the current data is equal to the quantized data of the previous frame and, thus, the image data is a static image. In an example (9) illustrated in FIG. 6B, the change to the image data Dc of a current frame from the image data Dp of the previous frame exceeds the threshold value c and the threshold value b and, therefore, the difference between the quantized data of the current data and the quantized data of the previous frame is 2 and, thus, the image data is determined to be a moving image.

In examples (10) to (13) illustrated in FIG. 6B, the change to the image data Dc of the current frame from the image data Dp of the previous frame exceeds the threshold value c. However, in the example (10), the image data Dp of the previous frame is out of the threshold-value proximity determination range (the threshold-value proximity determination data is "0") and the image data Dc of the current frame is within the threshold-value proximity determination range (the threshold-value proximity determination data is "1") and, therefore, the image data is determined to be a static image. Further, in examples (11) to (13), the image data is determined to be a moving image. Further, in the example (11), the image data Dp of the previous frame is out of the threshold-value proximity determination range and the image data Dc of the current frame is also out of the threshold-value proximity determination range. In the example (12), the image data Dp of the previous frame is within the threshold-value proximity determination range and the image data Dc of the current frame is also within the threshold-value proximity determination range. In the example (13), the image data Dp of the previous frame is within the threshold-value proximity determination range, but the image data Dc of the current frame is out of the threshold-value proximity determination range.

As described above, the image processing circuit according to the present embodiment determines whether image data of a current frame is a static image or a moving image on the basis of the quantized data and the threshold-value proximity determination data of the current frame and the quantized data and the threshold-value proximity determination data of the previous frame. Accordingly, the image processing circuit is capable of properly performing moving-image/static-image determination, even if there are noise and the like beyond threshold values, which can prevent the degradation of image quality due to enhanced FRC processing and the degradation of image quality due to enhanced noise. Further, while there has been described overdrive processing method using an LUT 5 in the present embodiment, the present invention is not limited thereto, and other overdriving processing method may be performed on image data which has been determined to be moving images through the aforementioned moving-image/static-image determination method.

Further, the threshold values, the aforementioned threshold-value proximity determination range and the LUT 5 which have been described above can be arbitrarily set in the present invention. This enables easily optimizing the image processing circuit according to the application and the environment of the liquid crystal display.

While the invention has been shown and described in detail, the foregoing description is in all aspects illustrative and not restrictive. It is therefore understood that numerous modifications and variations can be devised without departing from the scope of the invention.

What is claimed is:

1. An image processing circuit comprising:

a quantization unit to quantize image data input to a liquid crystal display with a predetermined threshold value and output the quantized data;

a threshold-value proximity determination unit to determine whether or not said input image data is proximal to said predetermined threshold value and output threshold-value proximity determination data;

a moving-image/static-image determination unit to determine whether or not said input image data of a current frame is a static image or a moving image, on the basis of said quantized data and said threshold-value proximity determination data of the current frame and said quantized data and said threshold-value proximity determination data of a previous frame; and an overdrive processing unit to output overdrive image data which has been subjected to overdrive processing if said moving-image/static-image determination unit determines that said input image data is a moving image.

2. The image processing circuit according to claim 1, wherein said overdrive processing unit performs overdrive processing on said input image data on the basis of a predetermined look-up table and selects overdrive image data which has been subjected to overdrive processing if said moving-image/static-image determination unit determines that said input image data is a moving image, but selects said input image data which has not been subjected to overdrive processing yet if said moving-image/static-image determination unit determines that said input image data is a static image.

3. The image processing circuit according to claim 1, wherein said threshold-value proximity determination unit determines that said input image data is proximal to said predetermined threshold value if said input image data is within a threshold-value proximity determination range, said threshold-value proximity determination range being the range from said predetermined threshold value to a value smaller than the predetermined threshold value by predetermined gray-scale, and said moving-image/static-image determination unit determines that said input image data is a static image if said quantized data of the previous frame and said input image data of the current frame has the same quantized value, determines that said input image data is a static image if the quantized value of said input image data of the current frame is greater by one than said quantized data of the previous frame and also said threshold-value proximity determination data of the previous data is proximal to said predetermined threshold value and said threshold-value proximity determination data of the current frame is not proximal to said predetermined threshold value, determines that said input image data is a static image if the quantized value of said input image data of the current frame is smaller by one than said quantized data of the previous frame and also said threshold-value proximity determination data of the current data is proximal to said predetermined threshold value and said threshold-value proximity determination data of the previous frame is not proximal to said predetermined threshold value, and determines that said input image data is a moving image in the other cases.

4. The image processing circuit according to claim 2, wherein said threshold-value proximity determination unit determines that said input image data is proximal to said predetermined threshold value if said input image data is within a threshold-value proximity determination range, said threshold-value proximity determination range being the range from said predetermined threshold value to a value smaller than the predetermined threshold value by predetermined gray-scale, and said moving-image/static-image determination unit determines that said input image data is a static image if said quantized data of the previous frame and said input image data of the current frame has the same quantized value, determines that said input image data is a static image if the quantized value of said input image data of the current frame is greater by one than said quantized data of the previous frame and also said threshold-value proximity determination data of the previous data is proximal to said predetermined threshold value and said threshold-value proximity determination data of the current frame is not proximal to said predetermined threshold value, determines that said input image data is a static image if the quantized value of said input image data of the current frame is smaller by one than said quantized data of the previous frame and also said threshold-value proximity determination data of the current data is proximal to said predetermined threshold value and said threshold-value proximity determination data of the previous frame is not proximal to said predetermined threshold value, and determines that said input image data is a moving image in the other cases.

5. The image processing circuit according to claim 3, wherein said predetermined threshold value, said threshold-value proximity determination range and said look-up table can be arbitrarily set.

6. The image processing circuit according to claim 4, wherein said predetermined threshold value, said threshold-value proximity determination range and said look-up table can be arbitrarily set.

7. The image processing circuit according to claim 1, wherein said quantization unit quantizes said input image data to a predetermined threshold value that is one of four or more threshold values.

* * * * *